E. B. SCATTERGOOD, OF ST. JOHN'S, MICHIGAN.

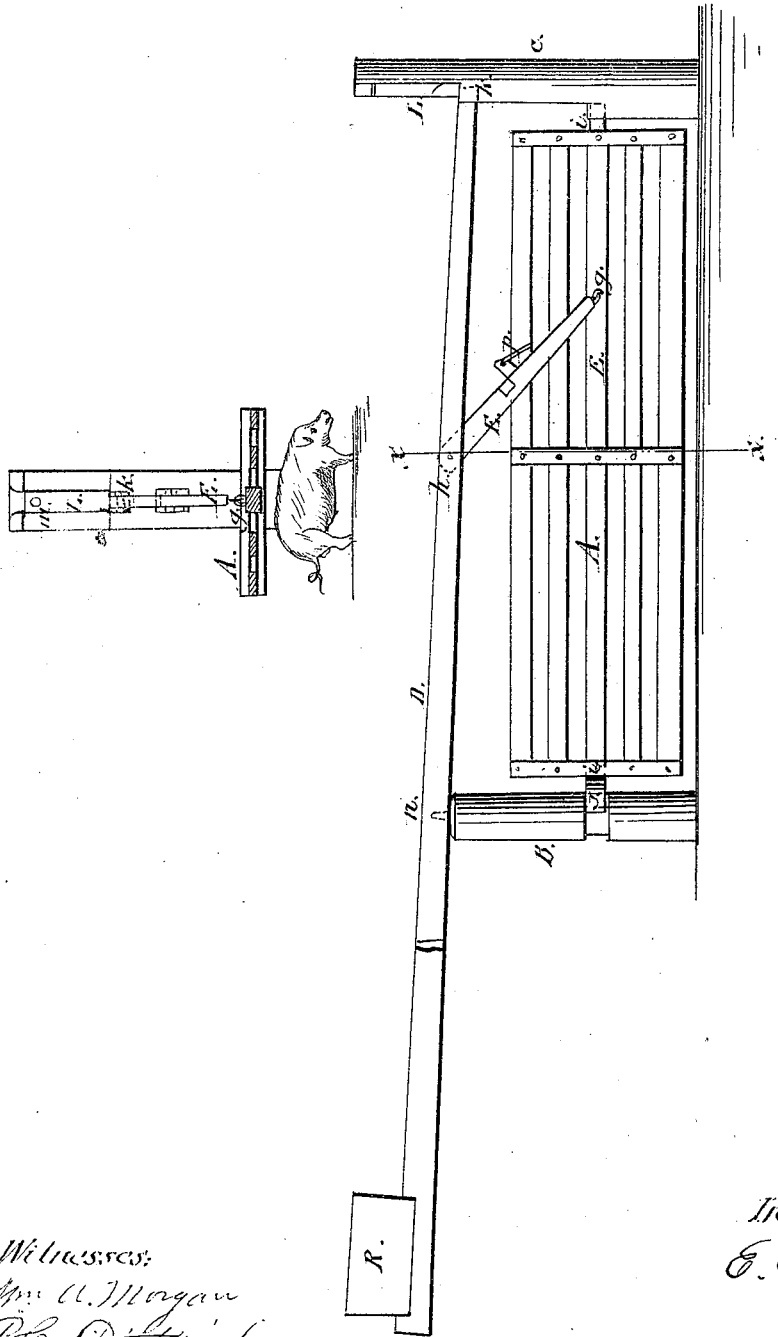

Letters Patent No. 87,206, dated February 23, 1869.

IMPROVEMENT IN GATES.

The Schedule referred to in these Letters Patent and making part of the same.

*To all whom it may concern:*

Be it known that I, E. B. SCATTERGOOD, of St. John's, in the county of Clinton, and State of Michigan, have invented a new and useful Improvement in Gates; and I do hereby declare that the following is a full, clear, and exact description thereof, which will enable those skilled in the art to make and use the same, reference being had to the accompanying drawings, forming part of this specification This invention relates to improvements in that class of farm-gates which are so hung as to swing like an ordinary gate, for the passage of vehicles or cattle, and to turn upon trunnions in the posts without swinging, so as to allow small animals to pass beneath it; and It consist in the arrangement of the bar which supports the gate from the weighted swinging bar, pivoted to the central rail of the gate, and carrying the clasp, adjusted to fit over the upper rail or board of the gate, whereby the latter can be turned up from either side, as occasion may require.

The drawing—

Figure 1, represents a front elevation of a gate constructed and operating according to my invention.

Figure 2 is a vertical cross-section of fig. 1 through the line $x\ x$, showing the gate turned on its pivots.

Similar letters of reference indicate corresponding parts.

A is the gate.

B is the post to which the gate is hung.

C is the post to which the gate fastens.

D is the balance-beam by which the gate is supported, and from which the forward end is suspended.

E is a bar which is attached to one of the rails F, of the gate, at its lower end, by a hook and eye or hinge-joint, as seen at $g$, and to the beam D by a pin or pivot-joint, where it passes through a mortise, as seen at $h$.

$i\ i'$ represent pivots in each end of the gate, on which the gate turns, as seen in fig. 2.

J is a segment of a circle which forms the hinge on which the gate swings, and which one of the pivots $i'$ enters.

The other pivot $i$ drops into a recess in the post C when the gate is closed, and fastens the gate as with a latch, as seen in the drawing.

The end of the balance-beam D also drops into a recess, as seen at $k$, where it is fastened by the drop-bar L, which is hung to the post C by a pin, $m$.

The beam D is balanced, with the gate attached, over the post B, on a pivot, as seen at $n$.

To keep the gate in an upright position, as seen in fig. 1, a clasp attached to the bar E is used, a seen at $p$.

By raising the clasp, the gate may be turned on its pivots $i\ i'$, as seen in fig. 2, so that hogs or other small animals may pass, while it presents an effective barrier to cattle and other large animals.

R is a box at the end of the beam, for receiving stone or other weight for balancing the gate.

The advantages of this arrangement are many, and must be obvious to all.

I claim as new, and desire to secure by Letters Patent—

The pivoted bar E and clasp $p$, arranged with reference to the centrally-pivoted gate A and the weighted bar D, operating in the manner described, for the purpose specified.

E. B. SCATTERGOOD.

Witnesses:
B. W. JOSLYN,
W. B. SCATTERGOOD.